(12) United States Patent
Wilcox et al.

(10) Patent No.: US 12,403,744 B2
(45) Date of Patent: Sep. 2, 2025

(54) TILTABLE CHASSIS FOR A THREE-WHEELED VEHICLE

(71) Applicant: Future Motion, Inc., Santa Cruz, CA (US)

(72) Inventors: Joseph Wilcox, Palo Alto, CA (US); Kyle Jonathan Doerksen, Santa Cruz, CA (US)

(73) Assignee: Future Motion, Inc., Santa Cruz, CA (US)

( * ) Notice: Subject to any disclaimer, the term of this patent is extended or adjusted under 35 U.S.C. 154(b) by 769 days.

(21) Appl. No.: 17/719,239

(22) Filed: Apr. 12, 2022

(65) Prior Publication Data
US 2022/0324285 A1 Oct. 13, 2022

Related U.S. Application Data

(60) Provisional application No. 63/173,950, filed on Apr. 12, 2021.

(51) Int. Cl.
*B62D 7/16* (2006.01)
*B60G 21/00* (2006.01)
(Continued)

(52) U.S. Cl.
CPC ........... *B60G 21/007* (2013.01); *B62D 7/166* (2013.01); *B62D 7/18* (2013.01); *B62D 61/065* (2013.01); *B62K 5/027* (2013.01); *B62K 5/05* (2013.01); *B62K 5/06* (2013.01); *B62K 5/08* (2013.01); *B62K 5/10* (2013.01)

(58) Field of Classification Search
CPC .... B60G 21/007; B60G 3/20; B60G 2300/12; B60G 2300/45; B60G 2300/122; B62D 7/166; B62D 7/16; B62D 7/18; B62D 9/02; B62D 61/06; B62D 61/065; B62K 5/027; B62K 5/05; B62K 5/06; B62K 5/08;
(Continued)

(56) References Cited

U.S. PATENT DOCUMENTS 6,435,522 B1 * 8/2002 Van Den Brink ....... B62D 9/02
280/5.509
10,577,044 B1 * 3/2020 Kejha ...................... B60K 5/00
(Continued)

FOREIGN PATENT DOCUMENTS

CN 105936298 A * 9/2016 ............. B60N 2/544
CN 209409742 U * 9/2019
DE 102014215979 A1 * 2/2016 ............... B60G 9/02

*Primary Examiner* — Keith J Frisby
(74) *Attorney, Agent, or Firm* — Kolitch Romano Dascenzo Gates LLC

(57) ABSTRACT

A three-wheeled vehicle may include one rear wheel and two front wheels coupled to a tiltable chassis, such that tilting of the chassis causes a corresponding tilting of the three wheels. The tiltable chassis includes a tiltable body coupled to a non-tilting frame by a pair of rotatable joints, such that the tiltable body is configured to rotate relative to the frame. A fore-and-aft connecting beam of the tiltable body extends beneath the frame to accommodate a battery compartment or other storage on top of the frame. A front tower extends upward from a front end of the connecting beam, above the frame, to couple to a tilt linkage and seat post of the vehicle. A rear tower extends upward from a rear end of the connecting beam to retain the rear wheel.

17 Claims, 8 Drawing Sheets

(51) Int. Cl.
  *B62D 7/18* (2006.01)
  *B62D 61/06* (2006.01)
  *B62K 5/027* (2013.01)
  *B62K 5/05* (2013.01)
  *B62K 5/06* (2006.01)
  *B62K 5/08* (2006.01)
  *B62K 5/10* (2013.01)

(58) Field of Classification Search
  CPC ...... B62K 5/10; B62K 5/02; B62K 2005/001; B60W 2300/367
  USPC .................. 280/124.103, 5.509, 62; 180/210
  See application file for complete search history.

(56) References Cited

U.S. PATENT DOCUMENTS

| | | | | |
|---|---|---|---|---|
| 2003/0102176 | A1* | 6/2003 | Bautista | B62K 5/027 280/124.103 |
| 2005/0206101 | A1* | 9/2005 | Bouton | B60G 21/007 280/6.154 |
| 2008/0100018 | A1* | 5/2008 | Dieziger | B60G 3/20 280/124.135 |
| 2009/0194961 | A1* | 8/2009 | Dieziger | B62K 5/01 280/124.103 |
| 2011/0148052 | A1* | 6/2011 | Quemere | B60G 21/073 280/6.15 |
| 2012/0098225 | A1* | 4/2012 | Lucas | B62K 5/10 280/124.103 |
| 2012/0181765 | A1* | 7/2012 | Hill | B62K 5/10 903/902 |
| 2013/0168934 | A1* | 7/2013 | Krajekian | B62K 5/05 280/62 |
| 2016/0272264 | A1* | 9/2016 | Mogensen | B62K 5/10 |
| 2019/0105959 | A1* | 4/2019 | Knisley | B62D 9/02 |
| 2019/0144035 | A1* | 5/2019 | Doerksen | B62K 5/10 280/124.103 |
| 2020/0262263 | A1* | 8/2020 | Doerksen | B60G 17/0162 |
| 2020/0269916 | A1* | 8/2020 | Doerksen | B62D 9/02 |
| 2021/0197916 | A1* | 7/2021 | Lin | B62K 5/10 |
| 2021/0331762 | A1* | 10/2021 | Mighell | B62K 5/10 |
| 2022/0017121 | A1* | 1/2022 | McLean | B60W 50/14 |

\* cited by examiner

TILTABLE CHASSIS FOR A THREE-WHEELED VEHICLE

CROSS-REFERENCES

The following applications and materials are incorporated herein, in their entireties, for all purposes: U.S. Provisional Patent Application Ser. No. 63/173,950, filed Apr. 12, 2021.

FIELD

This disclosure relates to systems and methods for three-wheeled vehicles. More specifically, the disclosed embodiments relate to a tiltable chassis for three-wheeled vehicles.

INTRODUCTION

Three-wheeled vehicles typically have several advantages over four-wheeled vehicles. For example, under most circumstances three-wheel vehicles are, by their nature, more stable than four-wheeled vehicles due to the fact that three contact points will form a plane under all circumstances, whereas four contact points will not. Another advantage is that three-wheeled vehicles afford a nearly ideal wheel loading distribution for maximum tire traction in both acceleration and braking situations. These advantages, among others, make three-wheeled vehicles promising candidates for a variety of applications, including personal recreational vehicles, rideshare vehicles, and robotic delivery vehicles. However, the potential of three-wheeled vehicles in these fields remains largely unfulfilled.

SUMMARY

The present disclosure provides systems, apparatuses, and methods relating to a tiltable chassis for a three-wheeled vehicle.

In some examples, a three-wheeled vehicle includes: a horizontal frame including a front crossbar, a middle crossbar, and a rear crossbar, each of the crossbars spanning between a left rail and a right rail, such that each of the crossbars is oriented transverse to a direction of vehicle travel; a pair of front wheels coupled to opposite ends of the front crossbar; a tiltable frame having a central shaft disposed below the horizontal frame and having a long axis oriented in the direction of vehicle travel, a front tower extending upward through the horizontal frame forward of the middle crossbar, and a rear tower extending upward behind the rear crossbar; and a single rear wheel coupled to the rear tower; wherein the tiltable frame is pivotably coupled to the horizontal frame, such that the tiltable frame pivots about an axis of rotation disposed above the long axis of the central shaft.

In some examples, a three-wheeled vehicle includes: a horizontal frame including a first crossbar disposed forward of a second crossbar, each of the crossbars spanning between a left rail and a right rail, such that each of the crossbars is oriented transverse to a direction of vehicle travel; a tiltable frame having a central shaft disposed below the horizontal frame and having a long axis oriented in the direction of vehicle travel, a front tower extending upward through the horizontal frame forward of the first crossbar, and a rear tower extending upward behind the second crossbar; a pair of front wheels coupled to the front tower by a mechanical linkage; and a single rear wheel coupled to the rear tower; wherein the tiltable frame is pivotably coupled to the horizontal frame, such that the tiltable frame pivots about an axis of rotation disposed above the long axis of the central shaft.

In some examples, a method of operating a three-wheeled vehicle includes: causing a handlebar and a front tilt linkage of a three-wheeled vehicle to pivot about a roll axis, such that a pair of front wheels coupled to the front tilt linkage pivot in unison; wherein a tiltable rigid portion of a chassis of the vehicle is coupled at a front end to the tilt linkage and at a rear end to a rear wheel of the vehicle, such that the rear wheel pivots in unison with the front wheels; wherein the tiltable rigid portion of the chassis comprises a front tower coupled to the tilt linkage, a rear tower coupled to the rear wheel, and a central shaft extending between lower ends of the front and rear towers; wherein the tiltable rigid portion of the chassis is pivotably coupled to a horizontal frame of the chassis to define the roll axis, and an entirety of the central shaft is disposed below the roll axis.

Features, functions, and advantages may be achieved independently in various embodiments of the present disclosure, or may be combined in yet other embodiments, further details of which can be seen with reference to the following description and drawings.

DETAILED DESCRIPTION

Figure 1:
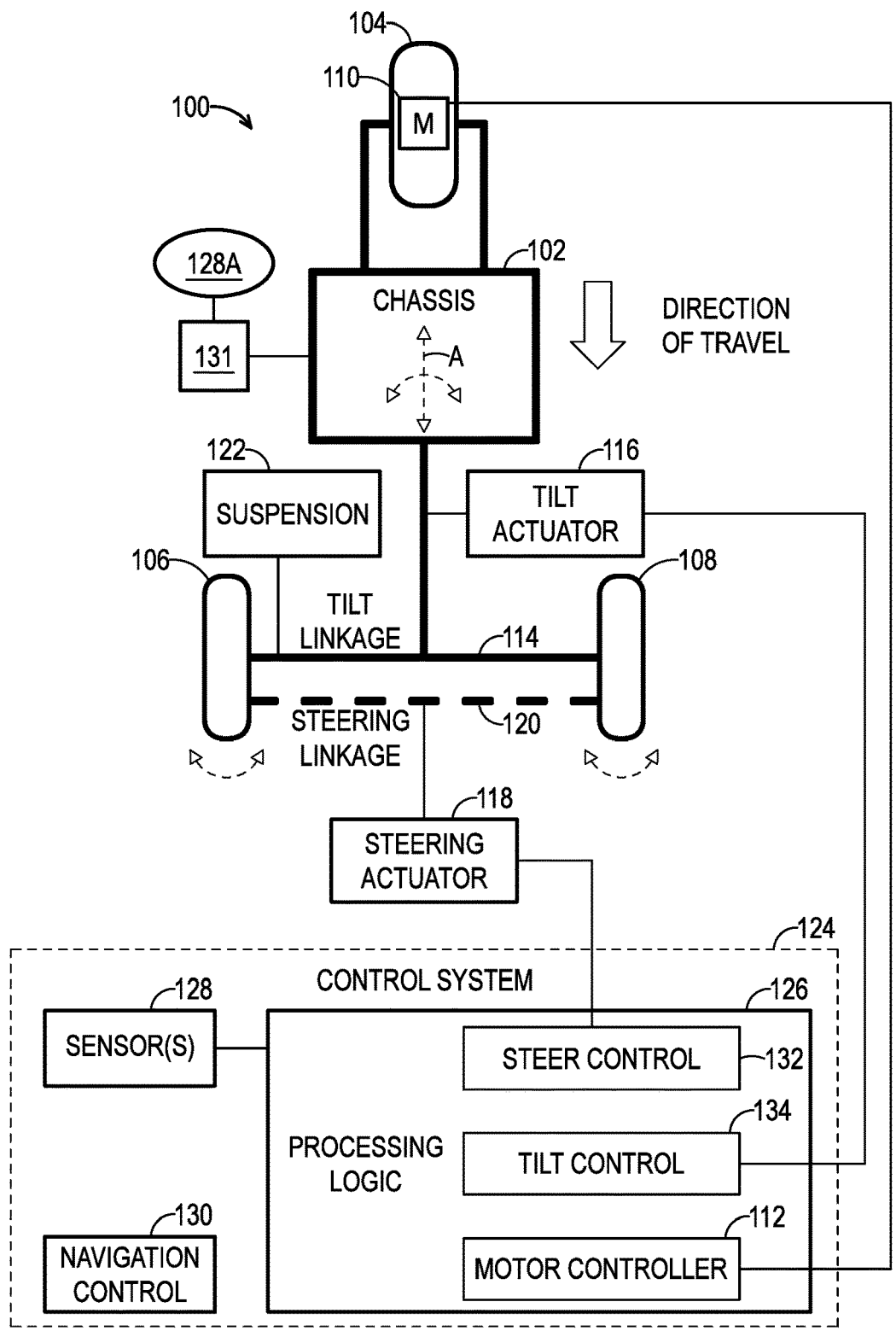
FIG. 1 is a schematic diagram of an illustrative titling vehicle in accordance with aspects of the present teachings.

Various aspects and examples of a tiltable chassis for a three-wheeled vehicle are described below and illustrated in the associated drawings. Unless otherwise specified, a three wheeled vehicle in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4)

Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

The terms "inboard," "outboard," "forward," "rearward," and the like are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "rearward" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a ridable vehicle of the present teachings may include three wheels coupled to a tiltable chassis. In some examples, the vehicle has one rear drive wheel configured to be driven by a motor, and two front wheels. The vehicle includes a tilt linkage coupling the two front wheels to the tiltable chassis of the vehicle, such that a tilting of the tiltable chassis causes a corresponding tilting of the front wheels of the vehicle. The tiltable chassis is coupled to the rear wheel of the vehicle, such that tilting of the tiltable chassis causes a corresponding tilting of the rear wheel of the vehicle. Tilting of the chassis may be controlled by an operator of the vehicle (e.g., by a rider's body motions). Optionally, the vehicle may include processing logic configured to automatically tilt the chassis of the vehicle to guide the vehicle down a selected path while maintaining a median plane of the vehicle chassis in alignment with a net force vector resulting from gravity and centrifugal force (if any).

In some examples described below, the vehicle includes three wheels, with a pair of linked wheels at a first end of the vehicle and a third wheel at an opposing end of the vehicle. However, any suitable number and arrangement of wheels may be used. A propulsion system of the vehicle may be coupled to any suitable wheel(s) to drive the vehicle forward and/or backward. In some examples, the vehicle has a pair of linked wheels at a front end, a single wheel at a rear end, and a motor configured to drive the rear wheel (e.g., a hub motor).

The vehicle may be of any suitable design configured to result in a coordinated and substantially identical tilting of the tiltable chassis and the wheels. For example, the tilt linkage of the vehicle may comprise a four-bar parallelogram linkage, coupling the left and right front wheels of the vehicle to the tiltable chassis of the vehicle. Examples of this type of vehicle are described below. Optionally, the vehicle may comprise a selectively robotic, semi-autonomous, or fly-by-wire vehicle. Optionally, the vehicle is configured to transform between a partially or completely manually operated mode and an autonomous or semi-autonomous mode.

In some examples, the tiltable chassis of the vehicle includes a tiltable body rotatably coupled to a generally horizontal main frame. The tiltable body may be rotatably coupled to the main frame of the chassis by a pair of rotatable joints, e.g., including pillow block bearings, such that the tiltable body is able to rotate about a tilt axis relative the main frame. The tiltable body is further coupled at a front end to the tilt linkage of the vehicle and at a rear end to the rear wheel of the vehicle, such that a tilting of the tiltable body causes a corresponding tilting of the three wheels. The main frame includes a battery compartment mounting area configured to receive a battery compartment for housing a battery of the vehicle. In some examples, a front crossbar of the main frame functions as a lower bar of the front tilt linkage.

The tiltable body is configured to accommodate a battery compartment mounted above the main frame, such that the battery compartment does not interfere with tilting of the vehicle. For example, the tiltable body may be generally u-shaped, having a front-to-rear connecting beam extending beneath the main frame, with front and rear towers extending upward on either end of the battery compartment mounting area. Thus, the battery compartment can be disposed above the connecting beam of the tiltable body, and between the front and rear towers. Disposing the battery compartment above the main frame allows easy access to the battery compartment for a user of the vehicle.

The front tower of the tiltable body is coupled to the tilt linkage of the vehicle and the rear tower of the tiltable body is coupled to the rear wheel of the vehicle, such that a tilting of the tiltable body causes a corresponding tilting of the three wheels of the vehicle. The front tower of the tiltable body may also be coupled to a seat post and a handlebar downtube of the vehicle.

In some examples, the vehicle has a steering linkage, which may include any suitable mechanism configured to convert a rotational force (e.g., a force generated by a turning of the handlebars of the vehicle) into a linear force for turning the front wheels of the vehicle. For example, the steering linkage may include a pair of tie rods, each of the tie rods having an inboard end coupled to a pitman arm, and an outboard end coupled to a steering knuckle of a respective front wheel of the vehicle. A steering shaft may extend downward from the handlebars to couple to the pitman arm and transfer rotational force, from the handlebars to the steering linkage. In some examples, a portion of the front tower is formed as a hollow tube, and the steering shaft extends through the hollow tube of the front tower to couple to the pitman arm of the steering linkage. In some examples, the steering linkage is an Ackermann steering linkage, such that control of the front wheels automatically compensates for the inside and outside wheel needing to trace circles of different radii during a given turn.

In some examples, the operator of the vehicle controls both the tilting of the tiltable chassis (e.g., by leaning from side to side), and the steering of the wheels of the vehicle (e.g., by turning the handlebars of the vehicle). Optionally, the vehicle includes a control system having processing logic configured to automatically tilt the chassis of the vehicle and in some cases actively steer the wheels of the vehicle to guide the vehicle down a selected path while maintaining a median plane of the vehicle chassis in alignment with a net force vector resulting from gravity and centrifugal force (if any). Tilting of the chassis and steering of the vehicle may be controlled completely by the operator, completely by the control system, or controlled by a combination of the operator and the control system.

Electromechanically controllable variables of the vehicle may include chassis tilt with respect to the wheel linkage, steering of the wheels, throttle or vehicle speed, and braking. Optionally, a control system of the vehicle may be configured to keep centrifugal and gravitational forces in equilibrium when turning, so that the combined centrifugal and gravitational vectors create a net force vector parallel to the chassis and wheel median planes. By directing the combined forces parallel to the chassis, stress on the vehicle suspension components (as well as riders where applicable) is reduced, rollover risk is decreased, and traction in a turn is improved or maximized.

An ideal leaning position of the chassis may be achieved through a combination of actuators and control software to create the desired performance. In some examples, tilt and steering angles are discretely controlled for a given turn. In some examples, steering is controlled by the operator and tilt is controlled automatically by an electronic controller of the vehicle. In some examples, the tilt to steer ratio is controlled, depending on speed and terrain, and higher speed leads to more vehicle chassis lean and less wheel steering. The tilt experienced at the chassis is a sum of the angle of the road surface plus the angle of the wheel linkage articulation. Detecting the level of the surface (or the chassis tilt displacement to correct) could in some cases be done using a suitable sensor near the road surface. However, it may be more effective to determine and maintain the absolute tilt angle of the chassis by measuring its relationship to the net force vector caused by gravity and any centrifugal forces.

In some cases, the interaction of crowned tires with the terrain must be accounted for, as the crowned shape of some wheels may produce scrub when tracking along the side of the wheel in a given turn vector over uneven or slanted terrain. For tilting three-wheeled vehicles, understeering or oversteering may be needed, depending on terrain, to counter the natural effect of the crowned wheel to oversteer or understeer into the turn. Generally speaking, this tire scrub is preferable to loss of the desired path of the vehicle.

In some examples, the vehicle may provide for the delivery of articles, objects, products, people, or goods from one location to another location using the wheeled vehicle. Control methods may be computer implemented, either partially or totally. As described above, the wheeled vehicle may optionally be remotely controlled, semiautonomous, mixed autonomous, or controlled completely by an operator of the vehicle. The vehicle may optionally be one of a plurality of wheeled vehicles, for example one of a plurality of identical wheeled vehicles. In some examples, the vehicle is one of a fleet of vehicles of a vehicle-sharing service. A vehicle-sharing service, also referred to as a ride-sharing service, may generally utilize bicycles, scooters, mopeds, automobiles, and/or any other suitable vehicles. The vehicles of the service may or may not be identical.

The vehicle may optionally be used on an indoor or an outdoor land transportation network, which may include roads, bike paths, sidewalks, alleys, paths, crosswalks, any route on which a wheeled vehicle may travel or any combination of the foregoing. Additionally, or alternatively, vehicles of the present disclosure may be suitable for use on roads (e.g., traffic lanes and/or bike lanes), bike paths, sidewalks, alleys, paths, crosswalks, and/or any combination of the foregoing. The vehicles may be suitable for use on paved terrain and/or unpaved terrain (e.g., dirt, gravel, grass, and/or the like).

In some examples, a tilt-lock system is provided which allows the vehicle to be fixed in an upright, untilted position. In some examples, the system includes a tilt-lock mechanism (e.g., a pivotable bracket) configured to selectively wedge the chassis into an upright orientation. The tilt-lock system may include a kickstand, a parking brake, a tilt lock bracket, and/or any other suitable device. Components of the tilt-lock system may be implemented electronically and/or mechanically. In some examples, aspects of the tilt-lock system may be controllable by a data processing system (e.g., a smartphone running a suitable application) in communication with the vehicle. The tilt-lock system may facilitate slow-speed driving (e.g., autonomously) and/or parking of the vehicle.

In some examples, the vehicle is equipped with fleet-management features, such a communications system configured to transmit sensed vehicle information (e.g., vehicle location, tire pressure, battery charge, and/or any other suitable information) to another device, such as a remote computer system (e.g., a computer not located onboard the vehicle). This can allow for convenient monitoring and maintenance of the vehicle. In some examples, the vehicle is one of a fleet of vehicles each configured to transmit vehicle information to a central fleet management computer.

In some cases, vehicles may be associated with predetermined docking stations from which the vehicles are borrowed and to which the vehicles are returned. Alternatively or additionally, the vehicles may be dockless vehicles that are dropped off and picked up by users in arbitrary locations, such as sidewalks, parks, bike racks, building lobbies, and/or the like. A vehicle currently not in use (e.g., having been dropped off by a user) should be able to remain safely in place until needed by a subsequent user. For example, the vehicle should be configured not to easily roll away or tip over, which may endanger the vehicle and/or passersby. However, the vehicle should also be readily usable by the subsequent user; that is, not too much work should be required of the subsequent user to make the vehicle ready to ride. Systems and methods of the present disclosure may, for example, allow for a vehicle of a vehicle-sharing system to be parked in a safe and stable state when not in use (e.g., between vehicle-sharing sessions of two users, or when a user has parked the vehicle during their session). For example, a parking system of the vehicle may allow a first user to leave the vehicle in a stable condition suitable for waiting minutes, hours, and/or days for a second user.

Optionally, the vehicle may include a control system(s) having any suitable processing logic for controlling the propulsion system, tilt system, and/or steering system to cause the vehicle to automatically travel along a desired path in a stable manner. Any suitable control methods may be used, including, e.g., any suitable relationship(s) between vehicle lean and vehicle steering. The control system may be further configured to enable additional vehicle functions, such as automatic unloading of vehicle contents, implementing aspects of a vehicle rental and/or ridesharing system, and so on.

Examples, Components, and Alternatives

The following sections describe selected aspects of illustrative tiltable chassis for a ridable vehicle as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Tilting Vehicles

As shown in FIG. 1, this section describes an illustrative three-wheeled vehicle 100 configured to tilt or lean from side to side, e.g., while cornering. Vehicle 100 is an example of the tilting vehicle generally described above.

FIG. 1 is a schematic diagram of vehicle 100. As depicted, vehicle 100 has three wheels coupled to a body or chassis 102, with a single drive wheel 104 in the rear, and two wheels 106 and 108 in front. Rear wheel 104 is driven by a motor 110 (e.g., a hub motor) to propel the vehicle in forward and reverse directions. Front wheels 106 and 108 are coupled to a front end of chassis 102 by a tilt linkage 114 configured to tilt the chassis of the vehicle as well as the front wheels, in a controlled manner. Tilt linkage 114 may include any suitable mechanical linkage, such as a four-bar linkage, configured to ensure a tilt of the front wheels corresponds to the tilt of the chassis. In some examples, the tilt linkage may include a simple four-bar parallelogram linkage, e.g., including an upper bar and a lower bar, each coupled at outboard ends to a left kingpin and a right kingpin. As used herein, the term kingpin refers generally to the component(s) comprising the main pivot for steering each wheel. Each of the kingpins includes an axle for rotational attachment of the respective wheels. The upper bar, lower bar, and kingpins may each be referred to as a "link" in the four-bar linkage. The kingpins may be referred to as "steering knuckles," as they include connection points for various components of the steering system.

Chassis 102 may be a two-part design including a main frame and a tiltable body rotatably coupled to the main frame, such that the tiltable body is able to tilt relative the main frame about a roll axis. The tiltable body is coupled to an upper bar of the tilt linkage, such that a tilting of the tiltable body causes a corresponding tilting of the front wheels of the vehicle. Additionally, a rear portion of the tiltable body is coupled to a rear wheel of the vehicle, such that a tilting of the tiltable body causes a corresponding tilting of the rear wheel of the vehicle. The main frame includes a battery compartment mounting area configured to mount a battery compartment for housing a battery of the vehicle. In some examples, the main frame includes footpad mounting areas configured to mount footpads or footrests for a rider of the vehicle.

The tiltable body is configured to avoid contacting components of the vehicle, such as the battery compartment, mounted above the main frame during tilting. For example, the tiltable body includes a connecting beam extending beneath the battery compartment mounting area, a front tower extending upward from the connecting beam on a front side of the battery compartment mounting area, and a rear tower extending upward from the connecting beam on a rear side of the battery compartment mounting area. The tiltable body may be coupled to the main frame by a pair of pillow bearings mounted on the connecting beam. The pair of pillow bearings are disposed on the front and rear side of the battery compartment mounting area. Disposing the connecting beam beneath the main frame allows the battery compartment to be disposed in a more easily accessible location above the main frame.

Optionally, the vehicle may include a tilt actuator 116 (also referred to as a lean actuator or roll actuator) operatively connected to tilt linkage 114, and may include any suitable electric motor (e.g., servo motor, step motor), rotary actuator, or other device configured to provide a rotational force for tilting the chassis and wheels. In some examples, the operator of the vehicle controls the tilting of the tiltable chassis (e.g., by the operator's body movements).

Chassis 102 further includes a rider support platform configured to accommodate a human rider and/or to receive control input from the rider. For example, a rider support platform may include a seat, a backrest, foot pegs, pedals, handlebars, and/or the like. Optionally, the handlebars may be electromechanically and/or virtually coupled to a steering actuator (described immediately below), such that the handlebars and/or the steering actuator may selectively control the steering at any given time. A portion or portions of the rider support platform may be repositionable in a functional sense, such that repositioning or displacing the portion of the platform sends a signal to change control modes and/or physically places the vehicle into a different control mode. For example, the handlebars and/or seat may be folded into an unusable position to place the vehicle into an autonomous or semiautonomous mode.

Steering of the vehicle may be accomplished by tilting and/or by controlled steering of the front wheels, e.g., by a rider of the vehicle turning the handlebars connected to a steering linkage 120. Optionally, the vehicle may include a steering actuator 118 operationally connected to the steering linkage 120. Various illustrative steering schemes are described further below. In this context, tilt or lean is defined as a lateral roll from side to side about a roll axis (e.g., axis A), while steering is performed by rotating the wheel or wheels about a yaw axis, such that the wheels point in a direction more to the left or right relative to their present orientation. At some vehicle speeds, steering may be performed entirely by way of tilting, while the front wheels are free to caster. At some vehicle speeds, steering may be performed entirely by actively steering the front wheels. At some vehicle speeds, a combination of methods may be utilized.

The optional steering actuator 118 may include any suitable electric motor (e.g., servo motor, step motor), rotary actuator, or other device configured to provide a rotational force for steering vehicle 100. The force from the steering actuator, and/or from a user turning the handlebars of the vehicle is converted by the steering linkage into a linear force for turning the wheels. The steering linkage may, for example, include one or more tie rods configured to mechanically couple actuator 118 or a steering shaft of the handlebars to wheels 106 and 108. In some examples, steering linkage 120 is an Ackermann steering linkage, such that control of the front wheels automatically compensates for the inside and outside wheel needing to trace circles of different radii during a given turn.

In some examples, vehicle 100 utilizes servo motors with planetary gearboxes for both the optional lean and the steer actuators. Other suitable actuators include worm gear boxes, linear actuators connecting linkage elements, hydraulic actuators, harmonic drive units, stepper motors, direct torque actuators, and/or the like. Generally, the tilt actuator has a higher load requirement, and must generate more force than the steering actuator, such that different types of actuators may be used for each.

A suspension system 122 may be integrated into tilt linkage 114, steering linkage 120, and/or coupled to wheels 106 and 108. A separate suspension system may be provided for rear wheel 104. Suspension system 122 may include any suitable biasing and/or damping device(s) configured to facilitate travel over a rough or bumpy terrain. For example, suspension system 122 may include one or more shock absorbers and/or springs. Suspension system 122 is configured to reduce shock and vibration loads to cargo as well as to the sensing and control systems and vehicle chassis. There are several possible approaches to suspending the vehicle in a shock absorbing manner, including but not limited to: four-bar linkages, leading links, A-arms, linear/telescoping direct suspension, and/or the like.

An optional control system 124 (e.g., an onboard control system) of vehicle 100 may include any suitable processing logic 126 configured to control the various actuators in view of information from one or more optional vehicle sensors 128 and/or in response to commands received from a navigation control system 130. Navigation control system 130 may include any suitable navigation system configured to direct vehicle 100 along a path toward a destination, and disposed either onboard vehicle 100, remotely (e.g., a remote-control unit), or a combination thereof.

The optional sensors 128 may include any suitable devices configured to determine information regarding vehicle 100 and/or its physical operating environment. For example, the sensors 128 may include sensing units typically found on autonomous vehicles. Example sensors may include temperature sensors, tire pressure sensors, tilt or other orientation sensors (e.g., accelerometers), speed sensors, and/or the like.

The optional processing logic 126 may include any suitable modules or hardware configured to carry out control algorithms with respect to the operation of vehicle 100. For example, processing logic 126 may include motor controller 112, a steering controller 132 configured to control steering actuator 118, and/or a tilt controller 134 configured to control tilt actuator 116, as well as processing logic configured to coordinate the activities of any or all of these controllers.

The control system 124 may be in wireless communication with a remote system, e.g., a remote portion of navigation control 130, and therefore may include a wireless radio system configured to transmit and receive information, e.g., by a transceiver.

Several illustrative steering schemes may be implemented by the control system and vehicle 100. In some examples, the user of the vehicle controls the tilting and steering of the vehicle without use of the control system. In some examples, tilt is controlled to automatically maintain the net force vector in alignment with a median plane of the chassis, based on or in response to steering by the user. Optionally, the vehicle may have an autonomous mode. In the autonomous mode there are several possible relationships of lean (i.e., tilt) to steering. Selected relationships and related control system configurations are discussed below:

a. Mechanically Linked Lean to Steer

In this case, the mechanical linkages result in a fixed ratio to cause the wheels of the vehicle to be turned when they lean. In embodiments of this type, it may be desirable to dynamically change the lean-to-steer ratio with respect to speed, to provide both low speed maneuverability and high speed stability.

b. Electrically Linked Lean to Steer

In this case, lean angle is the primary control vector utilized to determine how much to actively steer the vehicle. Steering is controlled by the steering controller and actuator, based on the lean angle, vehicle speed, and other factors.

c. Free to Caster (FTC)

In this case, lean angle is the primary control vector for the vehicle, and the steering system is left free to assume any position. In other words, active steering is discontinued, and the wheels are freed to swivel or caster based entirely on ground forces and lean angle. Based on a trail/caster angle, the vehicle will mechanically select an optimum steering angle for the lean angle. This technique works well at higher speeds.

In FTC operation, the vehicle geometry is designed so that when tilt is initiated, the front wheels will caster or swivel to the proper steering angle for any given combination of lean and speed. This relationship can be roughly expressed as S=T/V, where S is steer angle, T is tilt angle, and V is velocity. In a given turn, if the maximum lean has already been achieved, but the vehicle needs to turn more tightly, reducing speed will cause the turn radius to decrease in accordance with the FTC dynamics.

With FTC, a vehicle will also counter-steer when entering a drift from loss of rear wheel traction, and will also counter-steer in the case of one front wheel coming off the ground during the initiation of tilt with a high center of gravity (CG) or a very narrow wheelbase. A tilting three-wheeled vehicle utilizing an FTC control scheme is resistant to flipping over for this reason.

d. Free Leaning

In this case, the steering angle is the primary control vector and the vehicle is free to lean. Embodiments of this type may use a tilt-locking mechanism to prevent undesirable instabilities, maintaining the vehicle at a set angle (e.g., vertical) or range of angles. Furthermore, the steering angle may operate under closed-loop control to balance the vehicle, similar to the way a bicyclist or motorcyclist balances their vehicle using a combination of body lean, counter-steering, and other inputs.

e. IMU-Based Lean Follows Steer

In this case, steering angle is the primary control vector for the vehicle. Accelerometer and/or gyro sensors sense the lateral forces on the vehicle, and the tilt actuator runs a control loop to minimize the component of lateral acceleration showing a tendency to slide the vehicle out of the turn.

f. Combination Methods

In some cases, the above techniques can be used in combination with clutches/brakes on either the steer or lean actuators or both, or the actuators can be programmed into a "simulated low-inertia control mode" where they act as followers. This can be turned on and off (gradually) at certain vehicle speed breakpoints to provide optimal handling in both the low and high-speed domains. Additionally, control rules may need to be modified when the vehicle is operating in reverse.

For any of the above control schemes, a desired tilt angle for the vehicle in question is in general derived by determining what side-to-side lean or tilt angle results in a net force vector aligned with the central vertical plane of the chassis, also referred to as the median plane, i.e., a plane through the vertical centerline of the vehicle dividing or bisecting the chassis into left and right portions. The net force vector is defined as the combined force vector resulting from downward gravity and lateral centrifugal force. A sensor (e.g., an accelerometer) on the vehicle detects lateral deflection of the force vector on the chassis (e.g., due to centrifugal forces from initiating a steered turn, or lateral forces from uneven terrain during a turn or during normal operation). In response, a tilting actuator and in some cases a steering actuator are adjusted to return the net force vector to substantial alignment with the median plane of the chassis. Lean angle changes with speed and tightness of turn radius. Given the desired or optimum tilt angle for a given turn radius and/or speed, (i.e., the angle that keeps the net force vector in alignment with the chassis) the tilt linkage may be altered to maintain that tilt angle, and also to keep the tilt angle regardless of uneven/changing ground surface.

Lean (AKA tilt) to steer ratios are calculated to maintain the summary force vector (with respect to centrifugal force and the force due to gravity) in alignment with the median plane of the tilting vehicle. Generally speaking, the faster the vehicle goes for any given turn radius, the more the vehicle chassis needs to lean in order to keep this summary force vector in alignment with the median plane of the tiltable chassis. Higher speed or decreased turning radius results in an increase to the desired lean angle.

The optional control system 124 may include any suitable processing logic configured to carry out algorithms such as those described herein. For example, a PID (proportional integral derivative) controller may be utilized, having a control loop feedback mechanism to control tilt/steer variables based on force vector measurement.

For example, during the turning of vehicle 100, while lateral accelerations and/or centrifugal forces are exerted on chassis 102, vehicle control system 124 may direct the one or more tilt actuators 116 to pivot and/or tilt chassis 102 so as to compensate in whole or in part for such lateral accelerations and/or centrifugal forces. Processing logic 126 may receive input from one or more of sensors 128, to measure such accelerations, centrifugal forces and/or other characteristics of chassis 102 so as to determine the degree, amount, and/or angle to which the chassis should be pivoted and/or tilted by the one or more tilt actuators 116. For example, an IMU sensor, which may be included in the one or more sensors 128, and may optionally include a solid-state accelerometer, may be utilized for measuring any suitable acceleration and/or force in this regard. The degree, amount, and/or angle of such tilt may be sensed and/or measured by any suitable sensor, and directed back to processing logic 126 and/or other aspects of the control system as feedback. Any suitable algorithm may be programmed into the control system, either as firmware, software or both, for analyzing the input signals provided by one or more sensors and for instructing and/or controlling the one or more tilt actuators.

One or more braking mechanisms of vehicle 100 may be controllable by control system 124 to cause slowing of the vehicle along its direction or path of travel.

In some examples, vehicle 100 is directed by control system 124 to travel over a transportation network from a first location to a second location. Instructions regarding the second location and/or path(s) between the first and second locations may be stored in a memory of the vehicle control system, received by the vehicle control system from another source (e.g., a remote control), determined by the vehicle control system, and/or derived in any other suitable way. In some examples, such instructions are relayed to the vehicle from another location during the course of travel from the first location to the second location. In some examples, a vehicle controller receives GPS information (e.g., from an onboard GPS receiver, or indirectly from another source) for use in charting the course of travel from the first location to the second location. In some examples, the vehicle control system determines and/or adapts the course of travel based on readings from an onboard camera, LIDAR system, computer-vision system, proximity sensor, and/or the like.

In some examples, a course of travel between the first and second location is determined in advance (i.e., before the vehicle begins to travel), and may optionally be updated during travel (e.g., for collision avoidance). In some examples, the course of travel is determined as the vehicle travels, such that at any given time, the vehicle control system only knows a small portion of the travel path it will imminently take.

Based on the instructions, control system 124 sends appropriate commands to the motor, tilt actuator, and/or steer actuator to control the speed and direction of travel of the vehicle. Depending on the mode in which the vehicle is operating, the tilt actuator and steer actuator do not necessarily each receive instructions. For example, in a free-to-caster mode, the steering actuator is not used. In a free-leaning mode, the tilt actuator is not used.

Processing logic 126 receives input signals from one or more of sensors 128 indicating lateral accelerations and/or centrifugal forces exerted on the vehicle (e.g., during turns). In response, the processing logic sends appropriate commands to the one or more tilt actuators 116 to pivot and/or tilt chassis 102 of the vehicle relative to the travel surface and/or appropriate reference line or plane into a turn so as to compensate for such lateral accelerations and/or centrifugal forces.

In some examples, a PID loop of the control system is configured to automatically modulate a speed of the vehicle to attain desired turn radii. For example, if a tighter turn is needed, the vehicle may slow automatically, rather than steering or tilting, thereby reducing the turn radius.

B. Illustrative Chassis

Figure 2:
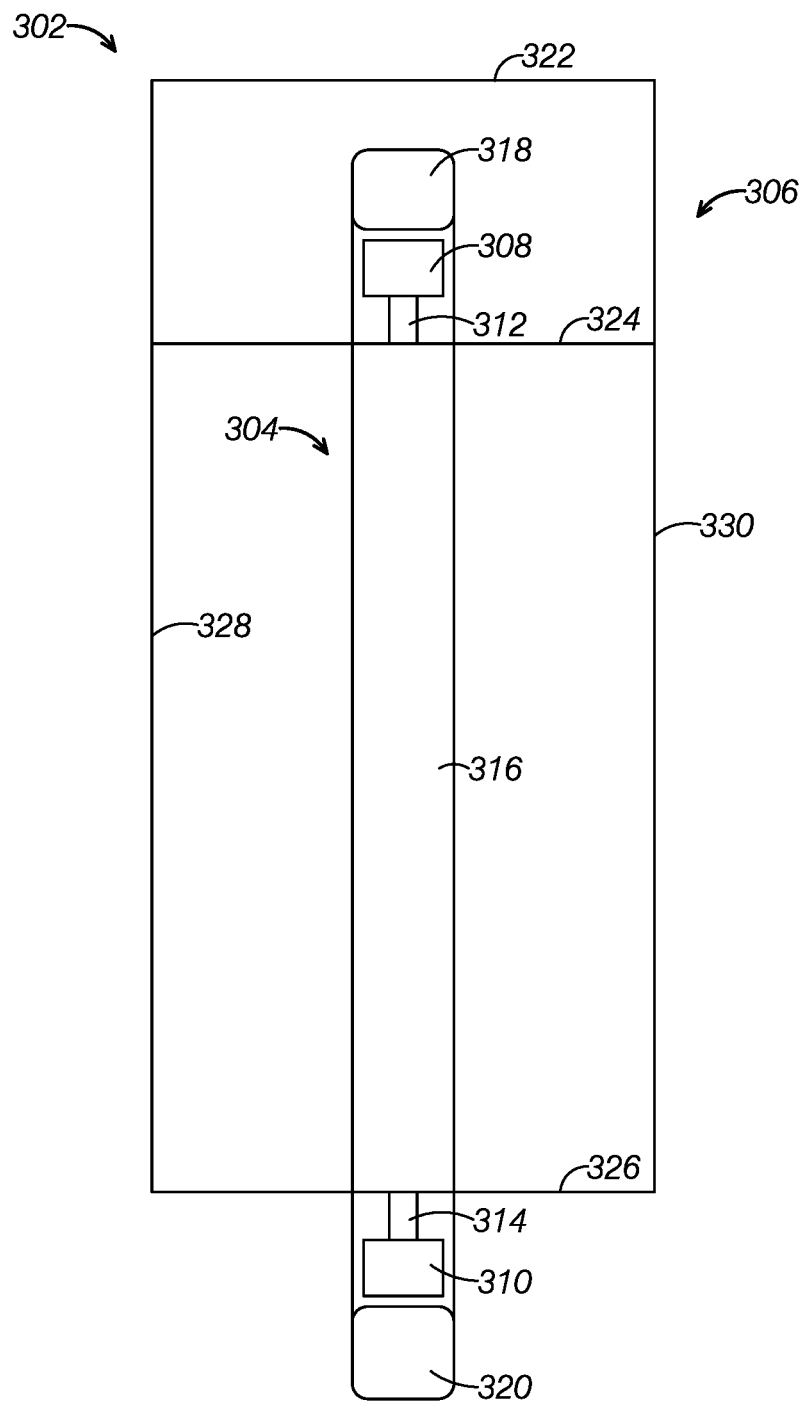
FIG. 2 is schematic top view of an illustrative tiltable chassis in accordance with aspects of the present teachings.
Figure 3:
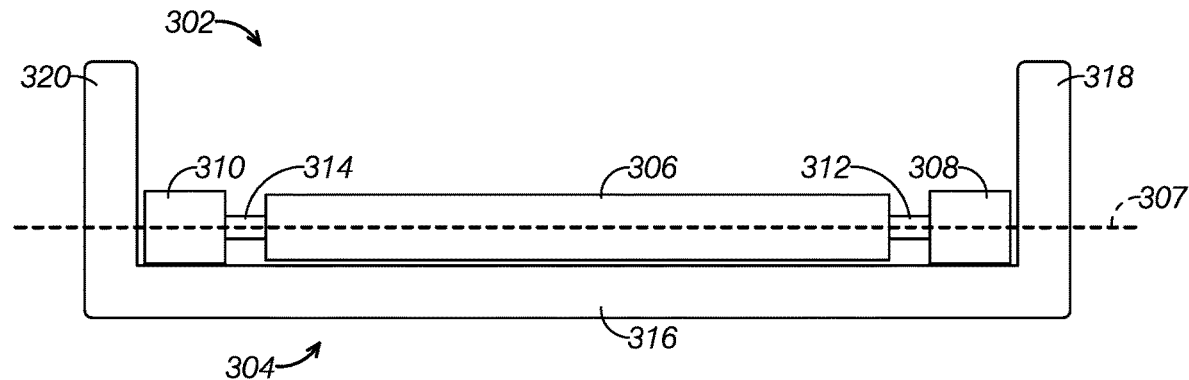
FIG. 3 is a schematic side view of the tiltable chassis of FIG. 2.
Figure 4:
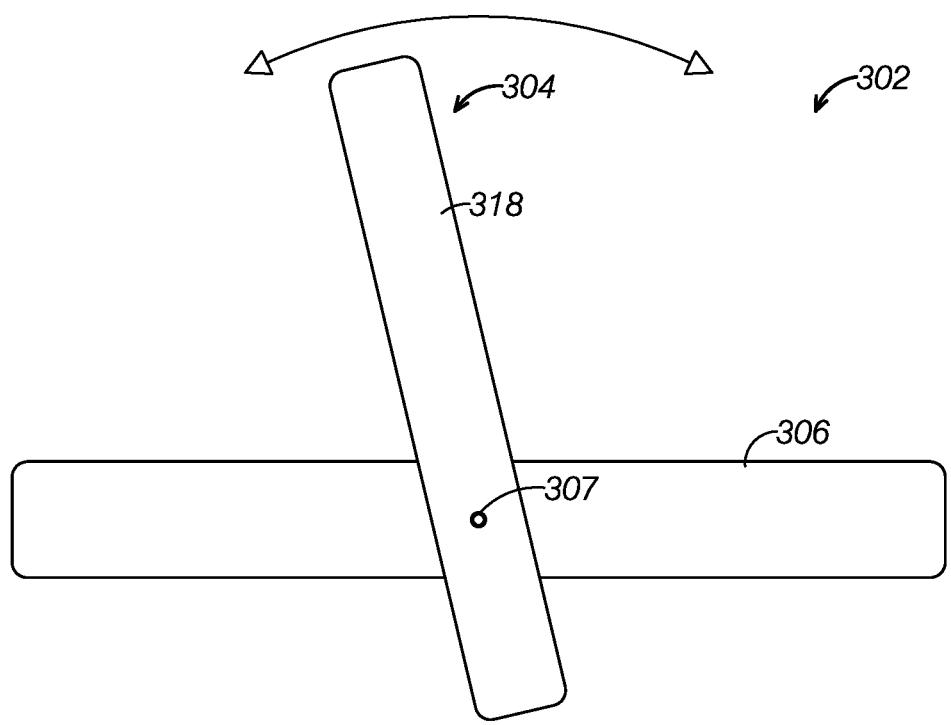
FIG. 4 is a schematic front view of the tiltable chassis of FIG. 2.

As shown in FIGS. 2-4, this section describes an illustrative tiltable chassis 302 of a three-wheeled vehicle in accordance with aspects of the present disclosure. Tiltable chassis 302 is an example of chassis 102, described above.

As shown in FIG. 2, tiltable chassis 302 is a two-part chassis including a tiltable body 304, and a non-tilting main frame 306. Main frame 306 is configured to provide a stable structure about which tiltable body 304 pivots, tilts or rotates. Tiltable body 304 is configured to rotate relative to main frame 306 about a roll axis 307 (A.K.A. axis of rotation) of the vehicle. In some examples, tiltable body 304 is coupled at a front end to a mechanical linkage connecting the front wheels of the vehicle, and coupled at a rear end to a rear wheel of the vehicle.

Main frame 306 is configured to remain generally horizontal during tilting of tiltable body 304, and to provide a stable structure for mounting components of the vehicle, such as a battery compartment. As shown in FIG. 2, main frame 306 includes a a front crossbar 322, a middle crossbar 324, and a rear crossbar 326, each of the crossbars spanning between a left rail 328, and a right rail 330 of main frame 306. Left rail 328, and right rail 330 extend from a front to a rear of the vehicle in the direction of vehicle travel, and the front, middle, and rear crossbars extend transverse to the direction of vehicle travel. In some examples, front crossbar 322 of main frame 306 is coupled at each end to the front wheel axles, such that main frame 306 is configured to remain generally horizontal during tilting of tiltable body 304. In some examples, middle crossbar 324, rear crossbar 326, left rail 328, and right rail 330 provide a structure for mounting the battery compartment or other components of the vehicle.

FIG. 3 shows a schematic side view of tiltable chassis 302. In FIG. 3, the front portion of main frame 306, forward of middle crossbar 324, is not shown. Tiltable body 304 is configured to avoid contacting components mounted above main frame 302 during tilting. For example, as shown in FIG. 3, tiltable body 304 may be generally u-shaped having a connecting beam 316 (A.K.A. central shaft) extending beneath main frame 306, a front tower 318 extending upward from a front end of connecting beam 316, and a rear tower 320 extending upward from a rear end of connecting beam 316. Connecting beam 316 extends along a long axis oriented in the direction of vehicle travel. Front tower 318 extends upward through main frame 306 forward of middle crossbar 324, and rear tower 320 extends upward behind rear crossbar 326. In some examples, front tower 318 is configured to couple to a seat post, and a mechanical linkage connecting the front wheels of the vehicle. Rear tower 320 is configured to couple to the rear wheel of vehicle. In some examples, main frame 306 is configured to provide a battery compartment mounting area above the main frame between front and rear towers 318 and 320.

Tiltable body 304 may be coupled to main frame 306 by any suitable mechanism configured to permit tiltable body 304 to tilt from side to side with respect to main frame 306. For example, as shown in FIGS. 2 and 3, tiltable body 304 is rotatably coupled to main frame 306 by a pair of pivotable joints supported by pillow block bearings, 308 and 310, mounted on top of connecting beam 316 of tiltable body 304. Main frame 306 includes a pair of pins, protrusions, or posts 312 and 314 extending along roll axis 307 into pillow block bearings 308 and 310. Post 312 extends forward from middle crossbar 324 into pillow block bearing 308, and post 314 extends rearward from rear crossbar 326 into pillow block bearing 310. Pillow block bearings, 308 and 310, may be mounted in any suitable position on tiltable body 304, such that a portion of tiltable body 304 is disposed beneath roll axis 307. For example, as shown in FIG. 3, pillow block bearings 308 and 310 are mounted on top of connecting beam 316 of tiltable body 304, such that connecting beam 316 is disposed beneath roll axis 307. In some examples, pillow block bearings 308 and 310 are mounted on a portion of a front tower 318, and/or a rear tower 320 of tiltable body 304. Disposing part of tiltable body 304 beneath roll axis 307 distributes a portion of the weight of tiltable body 304 beneath the roll axis, which increases stability during tilting of the tiltable body.

FIG. 4 shows a schematic front view of tiltable chassis 302 tilted. As shown in FIG. 4, tiltable body 304 is configured to tilt from side to side about roll axis 307 extending into and out of the page. The connecting beam extends rearward from a bottom portion of front tower 318 to connect to the rear tower, such that front tower 318, connecting beam 316, and rear tower 320 tilt together about roll axis 307. As described above, connecting beam 316 and portions of front tower 318 and rear tower 320 are disposed beneath roll axis 307. Disposing portions of tiltable body 304 beneath roll axis 307 increases the stability of the tiltable body during tilting. Main frame 306 remains generally horizontal during tilting of tiltable body 304.

C. Illustrative Vehicle including Illustrative Chassis

As shown in FIGS. 5-8, this section describes an illustrative three-wheeled vehicle 200 including an illustrative tiltable chassis 202 in accordance with aspects of the present disclosure. Vehicle 200 is an example of vehicle 100, described above. As shown in FIGS. 5-8, vehicle 200 includes three wheels coupled to tiltable chassis 202, with a single drive wheel 204 in the rear and two wheels, 206 and 208, in front. Rear wheel 204 is driven by a motor, such as an electric hub motor. Any suitable size and type of wheel may be used depending on the intended application of vehicle 200.

Generally, chassis 202 is a two-part chassis including a tiltable body 210 (A.K.A. tiltable frame), and a non-tilting main frame 212 (A.K.A. horizontal frame). Main frame 212 is configured to provide a structure for supporting and mounting other components of the vehicle, such as a battery compartment 226. Main frame 212 also provides a stable structure about which tiltable body 210 pivots, tilts, or rotates. Tiltable body 210 is configured to rotate relative to main frame 212 about a roll axis 218 of the vehicle. Tiltable body 210 is coupled to the three wheels of the vehicle, either directly or through a mechanical linkage, such that a rotation or tilting of tiltable body 210 causes a corresponding tilting of the three wheels of the vehicle.

Figure 5:
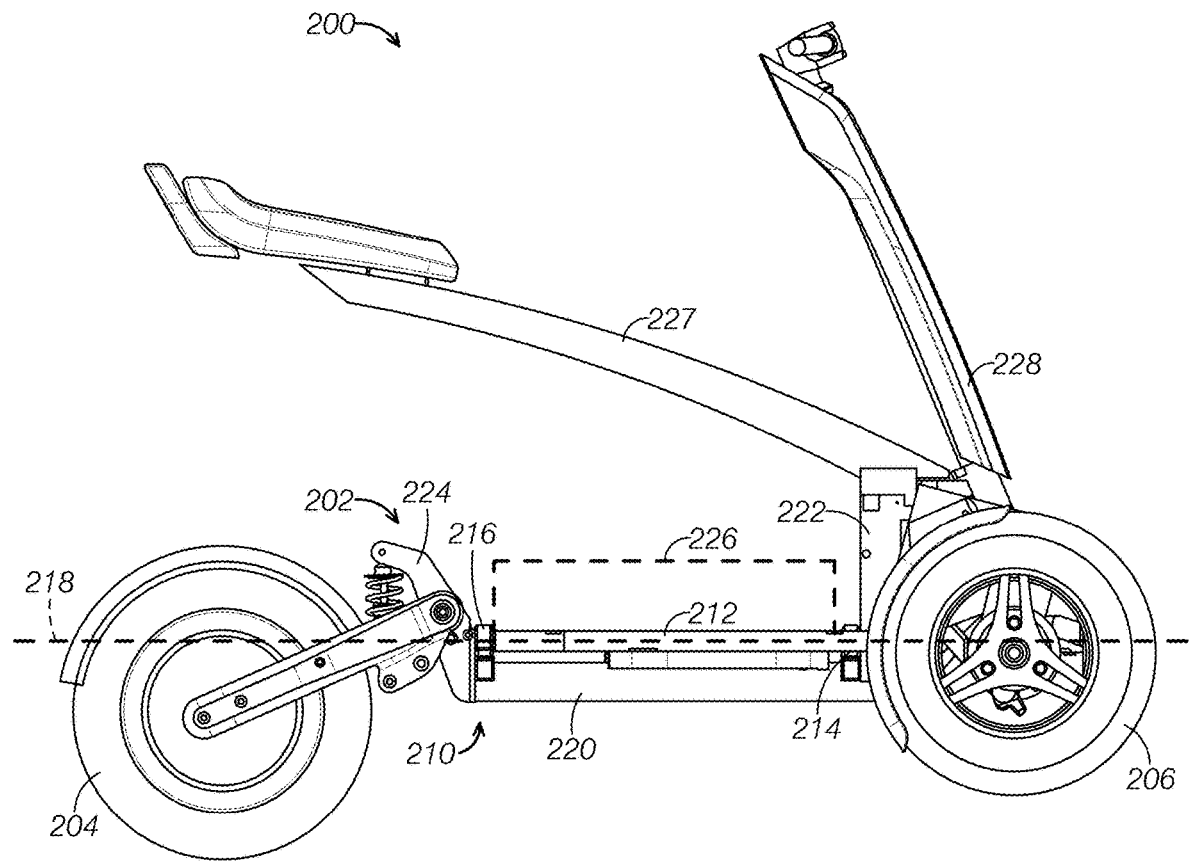
FIG. 5 is a side view of an illustrative three-wheeled tilting vehicle having a tiltable chassis in accordance with aspects of the present teachings.

Tiltable body 210 may be coupled to main frame 212 by any suitable mechanism configured to permit tiltable body 210 to tilt from side to side with respect to main frame 212 about roll axis 218. For example, as shown in FIG. 5, tiltable body 210 is rotatably coupled to main frame 212 by a pair of pivotable joints supported by pillow block bearings, 214 and 216, mounted on tiltable body 210. Main frame 212 includes a pair of pins, protrusions, or posts extending along roll axis 218 into pillow block bearings 214 and 216. These posts provide pivot points about which tiltable chassis body 210 tilts. Main frame 212 is coupled to the front wheel axles, such that the main frame is configured to remain generally horizontal or parallel to a support surface (e.g., the ground) during tilting of tiltable chassis body 210 to provide a stable structure for battery compartment 226 and other non-tilting components.

As shown in FIG. 5, battery compartment 226 is mounted on a top side of main frame 212 to provide easy access to the battery compartment for a user of the vehicle. Tiltable body 210 may be structured and coupled to main frame 212 in any suitable way, such that battery compartment 226 can be mounted on the top side of main frame 212 without interfering with the tilting of tiltable body 210. For example, as shown in FIG. 5, tiltable body 210 is generally u-shaped, including a horizontal connecting beam 220, a front tower 222 extending upward from a front end of connecting beam 220, and a rear tower 224 extending upward from a rear end of connecting beam 220. Connecting beam 220 extends beneath main frame 212, and front and rear towers, 222 and 224, extend upwards from connecting beam 220 on the front and rear sides of battery compartment 226. Disposing connecting beam 220 beneath main frame 212 (rather than above) frees up room above the main frame.

Vehicle 200 further includes a cantilevered seat post 227 and a handlebar downtube 228 coupled to front tower 222 of tiltable body 210. Coupling seat post 227 to tiltable body 210 enables a user of the vehicle to control tilting of the tiltable body through the user's body motions (e.g., leaning from side to side). Seat post 227 extends rearward and upward from front tower 222 above battery compartment 226. Seat post 227 includes a seat at a distal end.

Figure 6:
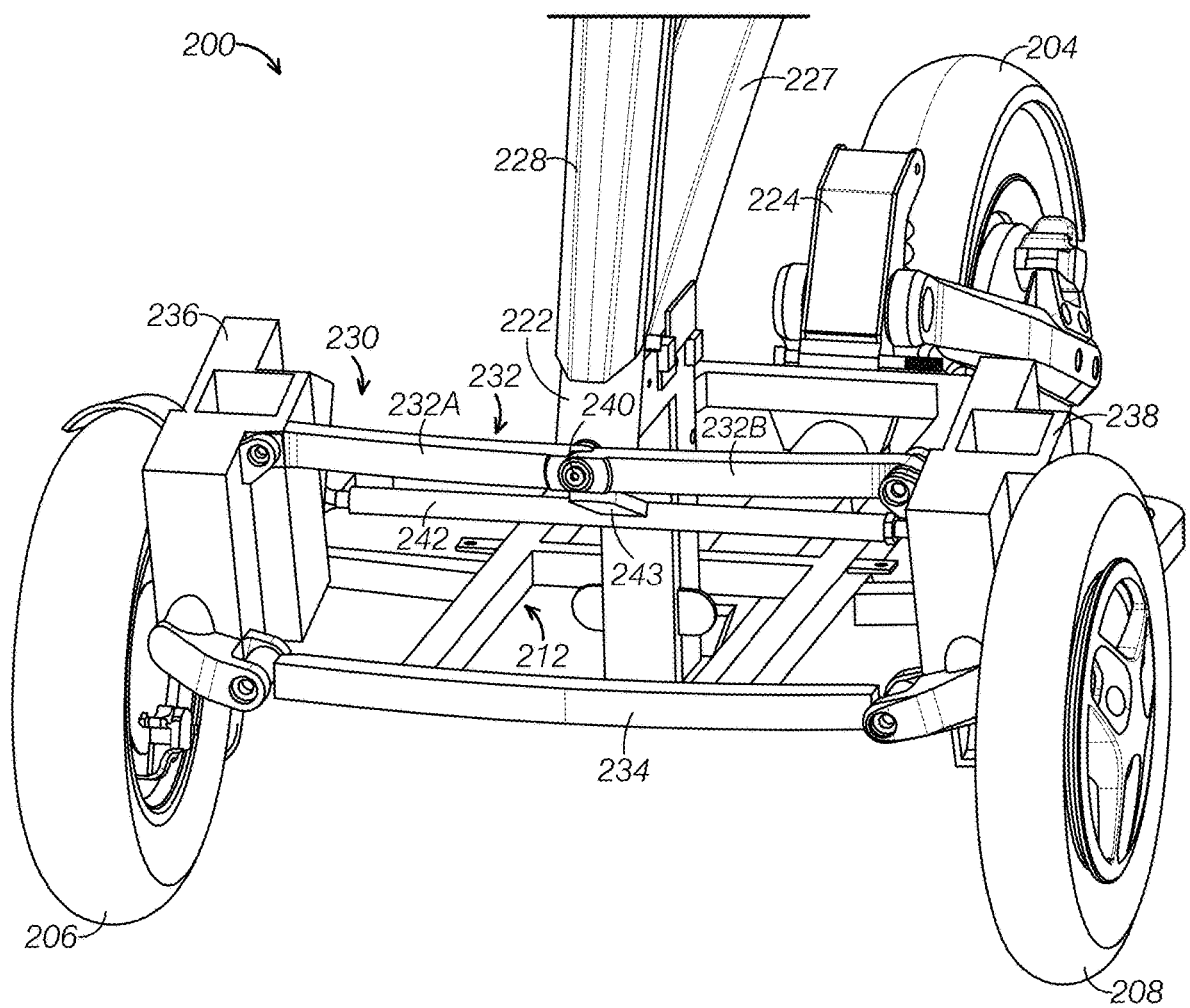
FIG. 6 is an orthogonal view of the tiltable chassis of FIG. 5.

Vehicle 200 includes a tilt linkage 230 connecting front wheels 206 and 208 to tiltable body 210. Tilt linkage 230 may include any suitable mechanism configured to ensure that a tilting of tiltable body 210 causes a corresponding tilting of the front wheels of the vehicle. For example, as shown in FIG. 6, tilt linkage 230 is a four-bar parallelogram linkage including an upper bar 232 and a lower bar 234. Upper bar 232 and lower bar 234 are each coupled at outboard ends to a left steering knuckle 236 and a right steering knuckle 238. Left steering knuckle 236 and right steering knuckle 238, depicted schematically in FIG. 6, each include an axle for rotational attachment of front wheels 206 and 208. Upper bar 232, lower bar 234, and left and right steering knuckles, 236 and 238, each define a respective link in the four-bar tilt linkage. Upper bar 232 of tilt linkage 230 is divided into two portions, 232A and 232B. Front tower 222 of tiltable frame 210 is attached to portions 232A and 232B at a common pivot point 240 by a rotary bearing. Lower bar 234 of the tilt linkage 230 comprises the front bar of main frame 212.

Respective ends of front bar 234 of main frame 212 are coupled to left steering knuckle 236 and right steering knuckle 238, such that the main frame is configured to remain generally horizontal or parallel to a support surface (e.g., the ground) during tilting of tiltable chassis body 210. However, the tilting of tiltable chassis 204 causes a tilting of the front wheels of the vehicle and a slight downward displacement of the left and right steering knuckles. The downward displacement of the steering knuckle of the outer wheel during a turn is greater than the downward displacement of the steering knuckle of the inner wheel. This causes main frame 212 to tilt slightly in the opposite direction with respect to tiltable body 204.

Vehicle 200 further includes a steering linkage 242. Steering linkage 242 may include any suitable mechanism configured to convert a rotational force (e.g., a rotational force generated by the operator of the vehicle turning the handlebars) into a linear force for turning the front wheels. For example, steering linkage 242 may include a pair of tie rods, each of the tie rods having an inboard end coupled to a pitman arm 243, and each of the tie rods having an outboard end coupled to a respective steering knuckle 236 and 238. A steering shaft extending down from the handlebars, through handlebar downtube 228, connects to pitman arm 243 to transfer rotational force from the handlebars to steering linkage 242. In some examples, a portion of front tower 222 is formed as a hollow tube, and the steering shaft extends through the hollow tube to couple to pitman arm 243. In some examples, steering linkage 242 is an Ackermann steering linkage, such that control of the front wheels automatically compensates for the inside and outside wheel needing to trace circles of different radii during a given turn. Steering linkage 242 and tilt linkage 230 facilitate turning or cornering of the vehicle either by tilting tiltable body 210, turning the handlebars, and/or a combination of tilting the tiltable body and turning the handlebars.

Figure 7:
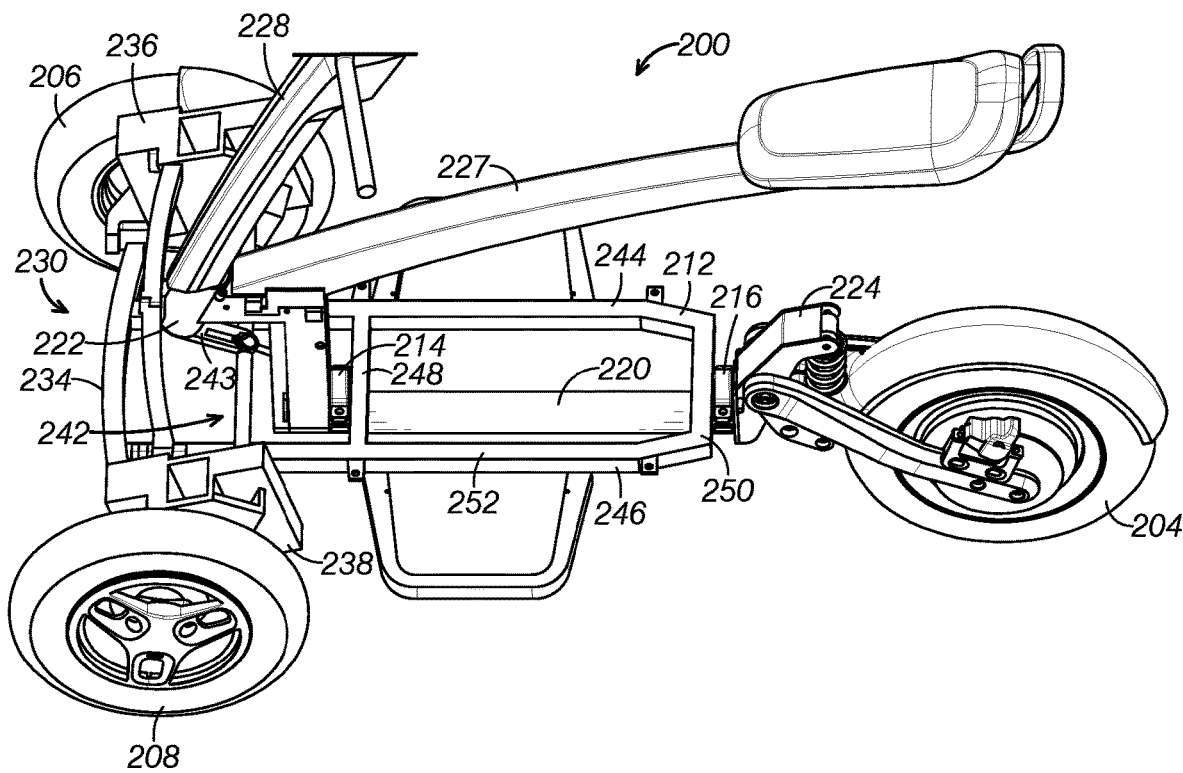
FIG. 7 is an orthogonal view of the tiltable chassis of FIG. 5.
Figure 8:
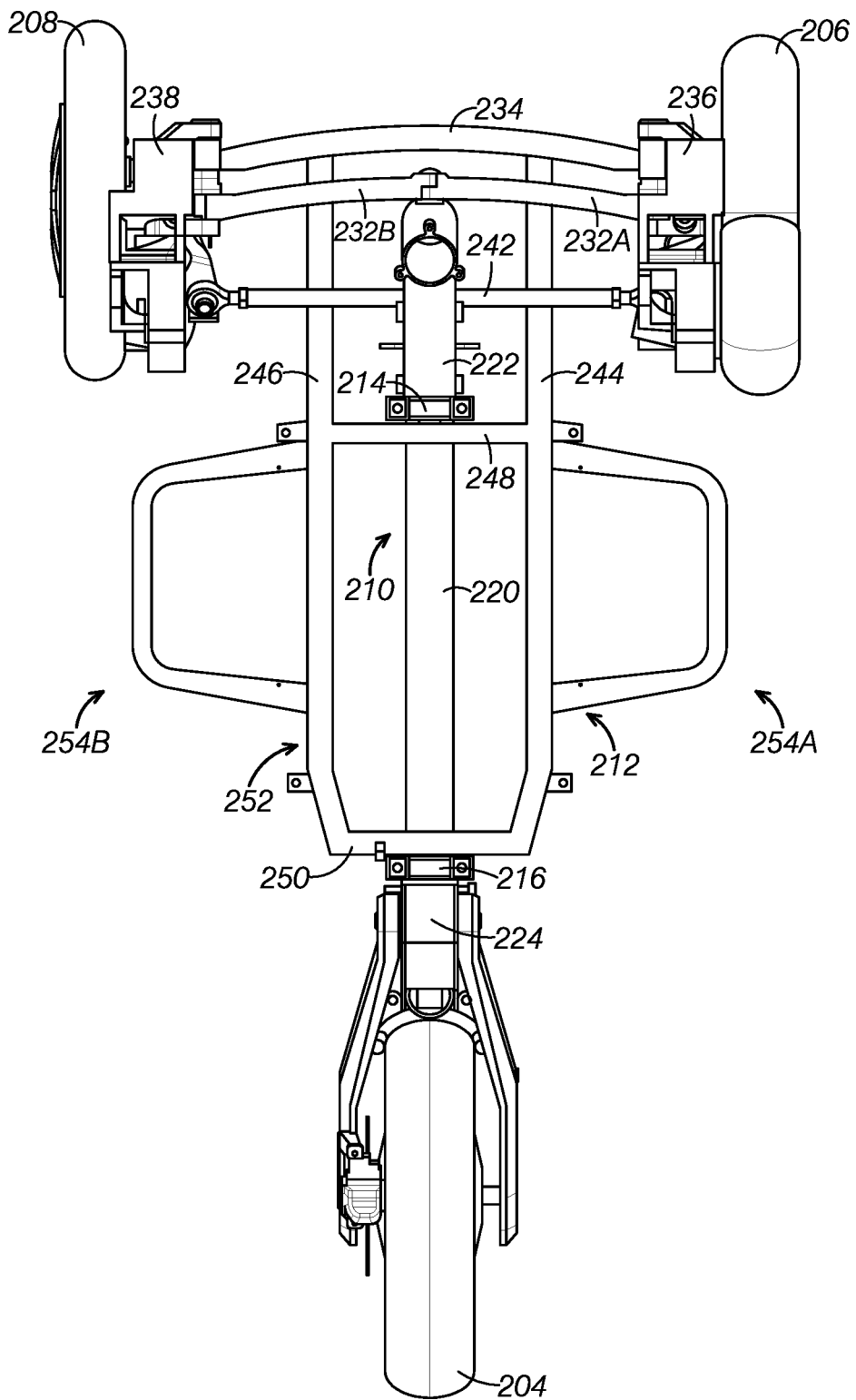
FIG. 8 is a top view of the tiltable chassis of FIG. 5.

Main frame 212 may include any suitable structure for mounting battery compartment 226. For example, as shown in FIGS. 7 and 8, main frame 212 includes a battery compartment mounting area 252 having a front bar 248, a rear bar 250, and two side bars, 244 and 246, which together form a generally rectangular structure for supporting battery compartment 226. Side bars, 244 and 246, extend parallel to one another in a rearward direction from lower bar 234 of tilt linkage 230. Front bar 248 and rear bar 250 extend across the vehicle and connect side bars 244 and 246 to each other. Battery compartment 226 is configured to house a battery of the vehicle, which provides power to the rear wheel motor. Main frame 212 further includes a pair of footpad mounts, 254A and 254B, extending laterally from each side of battery compartment mounting area 252.

As described above, tiltable body 210 is configured to avoid contacting battery compartment 226 during tilting of tiltable body 210. As shown in FIG. 7, front tower 222 of tiltable body 210 has a portion extending rearward from the upper bar of the tilt linkage, and a portion extending downward through main frame 212 to connect to connecting beam 220. The rearward extending portion of front tower 222 is raised higher than a top of battery compartment 226 to couple to seat post 227. The downward extending portion of front tower 222 extends through main frame 212 on the front side of battery compartment mounting area 252, between lower bar 234 of tilt linkage 230 and front bar 248 of battery compartment mounting area 252. An entirety of front tower 222 is disposed in front of battery compartment mounting area 252. Connecting beam 220 extends beneath battery compartment mounting area 252 from front tower 222 to rear tower 224. Rear tower 224 extends upward from connecting beam 220 on a rearward side of rear bar 250 of battery compartment mounting area 252. Thus, connecting beam 220 of tiltable chassis body 210 extends beneath battery compartment mounting area 252, and the front and rear towers extend upward from connecting beam 220 on the front and rear of battery compartment mounting area 252. This configuration enables the battery compartment 226 to be mounted on the top side of the main frame 212, without interfering with the tilting of the tiltable body 210. Mounting the battery compartment on the top side of the main frame 212 allows a user of the vehicle easy access to the battery compartment 226.

Tiltable body 210 is coupled to main frame 212 on the front and rear side of battery compartment mounting area 252 by posts supported in pillow block bearings 214 and 216. Pillow block bearings 214 and 216 are mounted on a top side of connecting beam 220 directly adjacent front tower 222 and rear tower 224 respectively. A first post extends forward along roll axis 218 from front bar 248 of the battery compartment mounting area into pillow block bearing 214. Similarly, a second post extends rearward along roll axis 218 from rear bar 250 into pillow block bearing 216. The first and second posts provide respective pivot points for the tiltable body to rotate about relative the main frame. Because the pillow block bearings are mounted on a top side of connecting beam 220, the connecting beam is disposed beneath pivot axis 218. Front tower 222 extends from connecting beam 220 above pivot axis 218 to couple to seat post 227 and handlebar downtube 228. Therefore, roll axis 218 is disposed between connecting beam 220 and the portion of front tower 222 coupled to seat post 227.

In some examples, front tower 222 and/or rear tower 224 may be formed separately from connecting beam 220 and coupled to connecting beam 220 during assembly of the vehicle. Alternatively, front tower 222 and connecting beam 220 may be formed as a single piece. In some examples, forming front tower 222 and connecting beam 220 as separate pieces facilitates ease of assembling the chassis, such that connecting beam 220 is disposed beneath main frame 212, and front tower 222 extends through main frame 212.

C. Illustrative Combinations and Additional Examples

This section describes additional aspects and features of a tiltable chassis for a ridable vehicle, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A three-wheeled vehicle, comprising:
a horizontal frame including a front crossbar, a middle crossbar, and a rear crossbar, each of the crossbars spanning between a left rail and a right rail, such that each of the crossbars is oriented transverse to a direction of vehicle travel;
a pair of front wheels coupled to opposite ends of the front crossbar;
a tiltable frame having a central shaft disposed below the horizontal frame and having a long axis oriented in the direction of vehicle travel, a front tower extending upward through the horizontal frame forward of the middle crossbar, and a rear tower extending upward behind the rear crossbar; and
a single rear wheel coupled to the rear tower;
wherein the tiltable frame is pivotably coupled to the horizontal frame, such that the tiltable frame pivots about an axis of rotation disposed above the long axis of the central shaft.

A1. The three-wheeled vehicle of paragraph A0, wherein the tiltable frame is pivotably coupled to the horizontal frame at a first rotating joint on a front side of the middle crossbar and at a second rotating joint on a rear side of the rear crossbar.

A2. The three-wheeled vehicle of paragraph A0 or A1, wherein the tiltable frame is pivotably coupled to the horizontal frame by a pair of rotating joints, each of the rotating joints including a pillow block bearing mounted to a top side of the central shaft.

A3. The three-wheeled vehicle of any one of paragraphs A0-A2, wherein the central shaft is disposed entirely below the horizontal frame.

A4. The three-wheeled vehicle of any one of paragraphs A0-A3, further comprising a cantilevered seat post extending rearward from the front tower.

A5. The three-wheeled vehicle of any one of paragraphs A0-A4, further comprising a mechanical linkage coupling the front tower to the front wheels, such that the mechanical linkage is configured to tilt the wheels when the tiltable frame pivots with respect to the horizontal frame.

A6. The three-wheeled vehicle of any one of paragraphs A0-A5, wherein the mechanical linkage is a four-bar linkage including the front crossbar of the horizontal frame.

A6. The three-wheeled vehicle of any one of paragraphs A0-A6, wherein the mechanical linkage is a four-bar linkage including the front crossbar of the horizontal frame.

B0. A three-wheeled vehicle, comprising:
a horizontal frame including a first crossbar disposed forward of a second crossbar, each of the crossbars spanning between a left rail and a right rail, such that each of the crossbars is oriented transverse to a direction of vehicle travel;
a tiltable frame having a central shaft disposed below the horizontal frame and having a long axis oriented in the direction of vehicle travel, a front tower extending upward through the horizontal frame forward of the first crossbar, and a rear tower extending upward behind the second crossbar;
a pair of front wheels coupled to the front tower by a mechanical linkage; and
a single rear wheel coupled to the rear tower;
wherein the tiltable frame is pivotably coupled to the horizontal frame, such that the tiltable frame pivots about an axis of rotation disposed above the long axis of the central shaft.

B1. The three-wheeled vehicle of paragraph B0, wherein the mechanical linkage is a four-bar linkage, and the front tower is coupled to an upper bar of the four-bar linkage.

B2. The three-wheeled vehicle of paragraphs B0 or B1, wherein the horizontal frame further includes a third crossbar disposed in front of the front tower, and the third crossbar is a lower bar of the four-bar linkage.

B3. The three-wheeled vehicle of any one of paragraphs B0-B2, wherein the tiltable frame is pivotably coupled to the horizontal frame at a first rotating joint on a front side of the first crossbar and at a second rotating joint on a rear side of the second crossbar.

B4. The three-wheeled vehicle of any one of paragraphs B0-B3, wherein the tiltable frame is pivotably coupled to the horizontal frame by a pair of rotating joints, each of the rotating joints including a pillow block bearing mounted to a top side of the central shaft.

B5. The three-wheeled vehicle of any one of paragraphs B0-B4, wherein the central shaft is disposed entirely below the rails and crossbars of the horizontal frame.

B6. The three-wheeled vehicle of any one of paragraphs B0-B5, further comprising a cantilevered seat post extending rearward from the front tower.

B7. The three-wheeled vehicle of any one of paragraphs B0-B6, further comprising a battery compartment disposed above the horizontal frame.

B8. The three-wheeled vehicle of any one of paragraphs B0-B7, wherein the battery compartment is coupled to the horizontal frame.

B9. The three-wheeled vehicle of any one of paragraphs B0-B8, further comprising a cantilevered seat post extending rearward from the front tower, wherein the battery compartment is disposed between the seat post and the horizontal frame.

C0. A method of operating a three-wheeled vehicle, the method comprising:

causing a handlebar and a front tilt linkage of a three-wheeled vehicle to pivot about a roll axis, such that a pair of front wheels coupled to the front tilt linkage pivot in unison;

wherein a tiltable rigid portion of a chassis of the vehicle is coupled at a front end to the tilt linkage and at a rear end to a rear wheel of the vehicle, such that the rear wheel pivots in unison with the front wheels;

wherein the tiltable rigid portion of the chassis comprises a front tower coupled to the tilt linkage, a rear tower coupled to the rear wheel, and a central shaft extending between lower ends of the front and rear towers;

wherein the tiltable rigid portion of the chassis is pivotably coupled to a horizontal frame of the chassis to define the roll axis, and an entirety of the central shaft is disposed below the roll axis.

C1. The method of paragraph C0, wherein the three-wheeled vehicle further comprises a cantilevered seat post extending rearward from the front tower of the tiltable rigid portion.

C2. The method of paragraph C1, further comprising storing a battery in a battery compartment disposed between the horizontal frame and the cantilevered seat post.

Advantages, Features, and Benefits

The different embodiments and examples of a tiltable chassis for a ridable vehicle described herein provide several advantages over known solutions for tiltable chassis. For example, illustrative embodiments and examples described herein allow the tiltable chassis to have a main frame and a tiltable body rotatably coupled to the main frame, such that the tiltable body is able to rotate relative to the main frame about a tilt axis. The two-part design of the tiltable chassis allows the main frame to be used for mounting a battery compartment housing a battery of the vehicle, and the tiltable body to be connected to a tilt linkage of the vehicle, such that a tilting of the tiltable body causes a corresponding tilting of the front wheels of the vehicle.

Additionally, and among other benefits, illustrative embodiments and examples described herein allow a main beam of the tiltable body to be disposed beneath the main frame. Disposing the main beam of the tiltable body beneath the main frame allows the battery compartment to be disposed above the main frame. Disposing the battery compartment above the main frame allows easy access to the battery compartment for a user of the vehicle. Disposing the main beam of the tiltable body also lowers the center of gravity of the vehicle.

Additionally, and among other benefits, illustrative embodiments and examples described herein allow a vehicle having a steering linkage and a tilting linkage, such that the vehicle can be turned via tilting of the tiltable body, turning of the handlebars of the vehicle, and/or a combination of tilting the tiltable body and turning the handlebars.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A three-wheeled vehicle, comprising:
  a horizontal frame including a front crossbar, a middle crossbar, and a rear crossbar, each of the crossbars spanning between a left rail and a right rail, such that each of the crossbars is oriented transverse to a direction of vehicle travel;
  a pair of front wheels coupled to opposite ends of the front crossbar;
  a tiltable frame having a central shaft disposed below the horizontal frame and having a long axis oriented in the direction of vehicle travel, a front tower extending upward through the horizontal frame forward of the middle crossbar, and a rear tower extending upward behind the rear crossbar; and
  a single rear wheel coupled to the rear tower;
  wherein the tiltable frame is pivotably coupled to the horizontal frame, such that the tiltable frame pivots about an axis of rotation disposed above the long axis of the central shaft.

2. The three-wheeled vehicle of claim 1, wherein the tiltable frame is pivotably coupled to the horizontal frame at a first rotating joint on a front side of the middle crossbar and at a second rotating joint on a rear side of the rear crossbar.

3. The three-wheeled vehicle of claim 1, wherein the tiltable frame is pivotably coupled to the horizontal frame by a pair of rotating joints, each of the rotating joints including a pillow block bearing mounted to a top side of the central shaft.

4. The three-wheeled vehicle of claim 1, wherein the central shaft is disposed entirely below the rails and entirely below the crossbars of the horizontal frame.

5. The three-wheeled vehicle of claim 1, further comprising a cantilevered seat post extending rearward from the front tower.

6. The three-wheeled vehicle of claim 1, further comprising a mechanical linkage coupling the front tower to the front wheels, such that the mechanical linkage is configured to tilt the front wheels when the tiltable frame pivots with respect to the horizontal frame.

7. The three-wheeled vehicle of claim 6, wherein the mechanical linkage is a four-bar linkage including the front crossbar of the horizontal frame.

8. A three-wheeled vehicle, comprising:
a horizontal frame including a first crossbar disposed forward of a second crossbar, each of the crossbars spanning between a left rail and a right rail, such that each of the crossbars is oriented transverse to a direction of vehicle travel;
a tiltable frame having a central shaft disposed below the horizontal frame and having a long axis oriented in the direction of vehicle travel, a front tower extending upward through the horizontal frame forward of the first crossbar, and a rear tower extending upward behind the second crossbar;
a pair of front wheels coupled to the front tower by a mechanical linkage; and
a single rear wheel coupled to the rear tower;
wherein the tiltable frame is pivotably coupled to the horizontal frame, such that the tiltable frame pivots about an axis of rotation disposed above the long axis of the central shaft.

9. The three-wheeled vehicle of claim 8, wherein the mechanical linkage is a four-bar linkage, and the front tower is coupled to an upper bar of the four-bar linkage.

10. The three-wheeled vehicle of claim 9, wherein the horizontal frame further includes a third crossbar disposed in front of the front tower, and the third crossbar is a lower bar of the four-bar linkage.

11. The three-wheeled vehicle of claim 8, wherein the tiltable frame is pivotably coupled to the horizontal frame at a first rotating joint on a front side of the first crossbar and at a second rotating joint on a rear side of the second crossbar.

12. The three-wheeled vehicle of claim 8, wherein the tiltable frame is pivotably coupled to the horizontal frame by a pair of rotating joints, each of the rotating joints including a pillow block bearing mounted to a top side of the central shaft.

13. The three-wheeled vehicle of claim 8, wherein the central shaft is disposed entirely below the rails and entirely below the crossbars of the horizontal frame.

14. The three-wheeled vehicle of claim 8, further comprising a cantilevered seat post extending rearward from the front tower.

15. The three-wheeled vehicle of claim 8, further comprising a battery compartment disposed above the horizontal frame.

16. The three-wheeled vehicle of claim 15, wherein the battery compartment is coupled to the horizontal frame.

17. The three-wheeled vehicle of claim 15, further comprising a cantilevered seat post extending rearward from the front tower, wherein the battery compartment is disposed between the seat post and the horizontal frame.

* * * * *